Dec. 19, 1922.
K. WILLIAMS,
HAND BRAKE
FILED SEPT. 8, 1921.
1,439,390
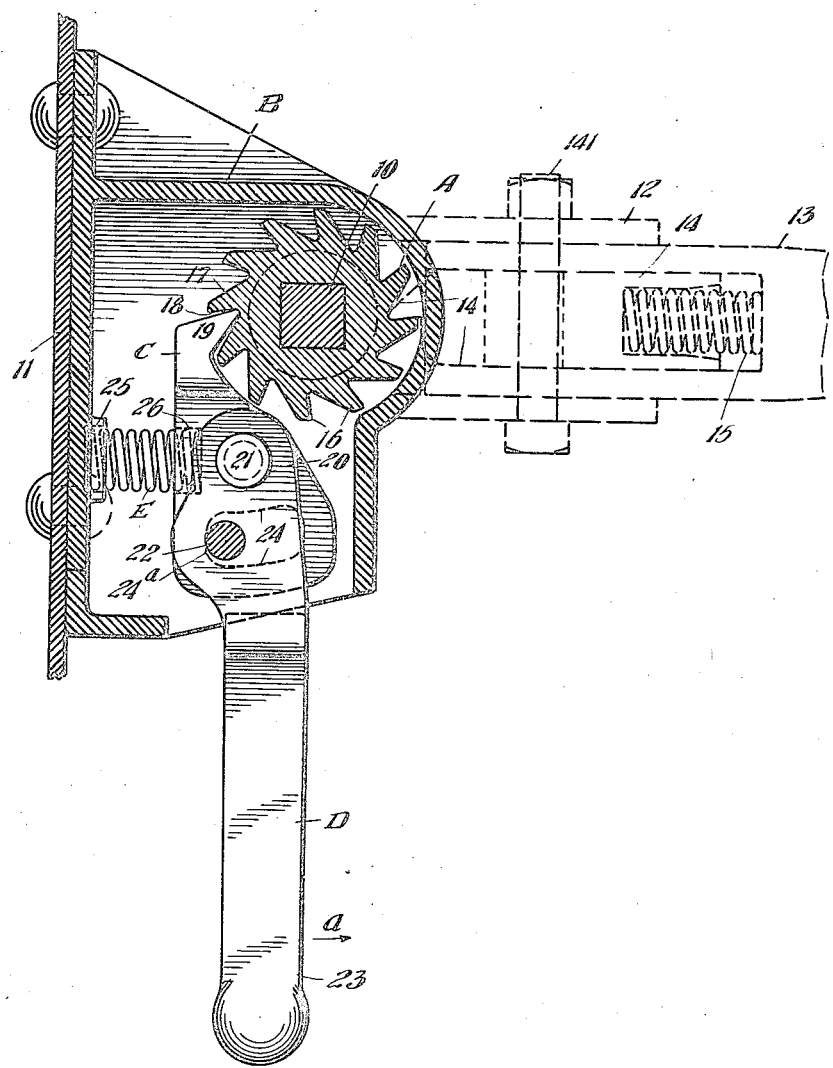
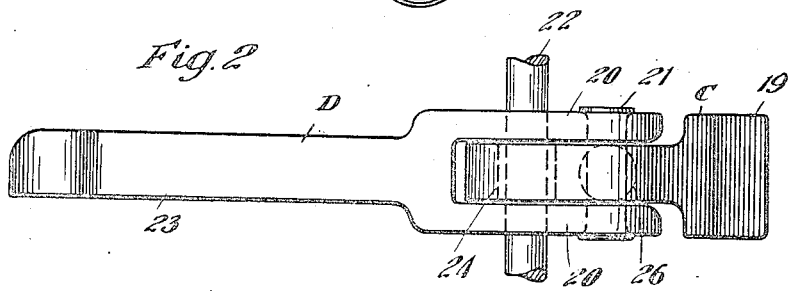
Witnesses
Wm. Geiger
Inventor
Keith Williams
By Geo. T. Haight
His Atty.

Patented Dec. 19, 1922.

1,439,390

UNITED STATES PATENT OFFICE.

KEITH WILLIAMS, OF CHICAGO, ILLINOIS, ASSIGNOR TO WILLIAM H. MINER, OF CHAZY, NEW YORK.

HAND BRAKE.

Application filed September 8, 1921. Serial No. 499,219.

*To all whom it may concern:*

Be it known that I, KEITH WILLIAMS, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

The objects of my invention are to provide a novel arrangement in a hand brake especially adapted for railway cars, by which the cost of finishing certain parts and assembling of the parts of the brake is materially reduced over present practice, and the operation rendered more efficient and reliable.

More specifically, the invention relates to certain improvements in that type of hand brake shown in the Dath Patent 1,300,351, granted April 15, 1919 and to which reference may be had for such details of construction that are not disclosed in my drawing.

In the drawing forming a part of this specification, Figure 1 is a horizontal sectional view through a hand brake mechanism, embodying my invention. The dotted lines indicate a portion of the operating lever and associated pawl when in horizontal operative position. Fig. 2 is a side elevational view of the improved release lever and locking dog shown in Fig. 1.

In the type of brake to which I have shown my invention applied in the drawing, a vertically extending brake staff is used as indicated at 10, the same having a squared or other non-circular section to which is applied a ratchet wheel A. Said staff and ratchet wheel A are suitably journaled in a supporting bracket B which is secured rigidly to a vertical wall 11 of a car. Oscillatably mounted on the staff with respect to it and the ratchet wheel A is a carrier indicated at 12 to which is pivotally attached a gravity drop handle or operating lever 13 by means of a bolt 141. The end of the lever 13 adjacent the pivot is formed with a socket within which is reciprocatingly mounted an operating pawl 14 normally projected outwardly under the influence of a spring 15. For a fuller understanding of the parts so far described, reference may be had to said Dath Patent 1,300,351.

In carrying out my invention, I form the ratchet wheel A with a series of peripherally located teeth 16—16, each of which is formed with an outer beveled face 17 and an operative undercut face 18. The latter is of great importance in the carrying out of my invention, as will be more fully explained hereinafter. Attention is directed at this time to the fact that the undercut faces 18 are distinguished from those of the prior art so far as I am aware, the prior art disclosing operative engaging shoulders which are radial with respect to the axis of the ratchet wheel and staff.

Cooperable with the ratchet wheel A is a heavy dog C. The latter is formed with a single heavy tooth 19, the angle of which is somewhat less than the included angle between the undercut face 18 of one tooth and the sloping face 17 of the next succeeding tooth so that the heavy tooth 19 will have the apex thereof extended fully into the notch or recess between any two teeth of the ratchet wheel A.

Said dog C is pivotally mounted between the forked ends 20—20 of a release lever D. The dog C is pivoted to the release lever by means of a rivet 21, as best shown in Fig. 2. The release lever D in turn is pivotally mounted on the bracket B on a suitable pivot rod or bolt 22. The handle proper 23 of the release lever is extended a suitable distance outwardly of the bracket B so as to render it accessible for pulling in the direction indicated by the arrow *a* when it is desired to release the brake.

The shank of the dog C is widened laterally at its free end as clearly indicated in Fig. 1 and is provided with an arcuate slot or recess 24 within which is accommodated the pivot 22 of the release lever D, while at the same time allowing the dog C to swing about the pivot 21 within the limits determined by the length of said recess 24.

An expansion spring E is seated at one end in a suitable socket 25 formed in the back wall of the bracket B, the other end of the spring being seated in a suitable socket 26 formed in the shank of the dog C.

Fig. 1 shows the position of the locking dog and release handle when the ratchet wheel A is being held against rotation in a release or unwinding direction. In this condition of the parts, it will be understood that the ratchet wheel A tends to rotate in a counter-clockwise direction on account of the tension imposed upon the brake chain. In the operative position of the parts, as described, it will be noted that the center of the pivot 21 is to the right of the line joining the axis of the pivot 22 and the effective point of engagement between the dog and the ratchet wheel A, as viewed in Fig. 1. Any pressure transmitted from the ratchet wheel A to the dog C will tend to swing the dog C in a counter-clockwise direction about its individual pivot 21, but this action will, of course, be limited by reason of the shank of the dog engaging the pivot 22 at the end of the recess 24 as indicated at 24ª in Fig. 1. Consequently, the greater the pressure transmitted from the ratchet wheel A to the dog C, the more efficiently said dog and release lever are held in their restraining position. During the winding of the brake when the ratchet wheel is rotated in a clockwise direction, it is evident that the dog C will slip over the ratchet wheel teeth against the action of the spring E. To release the ratchet wheel A by pulling the lever D in the direction indicated by the arrow $a$, the pivot 21 will first move toward the left, as viewed in Fig. 1, while the tooth of the dog C remains in engagement with the ratchet wheel and until such time as the opposite end of the opening 24 comes into engagement with the pivot 22, when the tooth of the dog will be disengaged from the ratchet wheel.

Heretofore, where the operative faces of the tooth of the ratchet wheel have been radial, it has been absolutely essential to accurately finish said face and the corresponding engaging parts of the locking dog, so as to eliminate the possibility of the said faces of the ratchet wheel teeth sloping in a direction away from the dog since this would produce a component of force acting on the dog when the ratchet wheel is under tension to rotate in an unwinding direction, which would throw out the dog and disengage it from the ratchet wheel, thereby releasing the brake unintentionally. Because of the accuracy required, heretofore, as above explained, the cost of manufacture has been unnecessarily high. Furthermore, as the parts are used in service and the operative faces of the ratchet teeth become worn, there is a constant tendency to force out the holding dog in the manner above described.

With my construction, less accuracy is required in the finishing of the ratchet wheel A, which is made as a casting, the only essential being that the operative faces 18 of the tooth shall be undercut and, as above explained, the greater the force exerted on the ratchet wheel to rotate in an unwinding direction, the more securely does the locking dog engage with the ratchet tooth of the wheel A and it is impossible to disengage the dog from the ratchet wheel accidentally on account of the fact that the pivot 21 is to the right or inside of the line connecting the pivot 21 with the point of engagement between the dog and the ratchet wheel.

I have herein shown and described only one specific form of my invention. I am aware that various changes and modifications may be made without departing from the spirit of the invention and all such changes and modifications are contemplated that come within the scope of the claims appended hereto.

I claim:

1. In a hand brake mechanism having an element adapted to be rotated to effect application of the brake proper, the combination with a ratchet wheel rotatable in unison with said element, said ratchet wheel being provided with peripherally located teeth each having an undercut operative bearing face; of a pivoted release lever; a toothed dog cooperable with said tooth of the ratchet wheel, said dog being pivoted to said lever at a point intermediate the lever pivot and the ratchet wheel; and cooperable means on the dog and lever, limiting the pivotal movement of the dog with respect to the lever when the dog is in operative engagement with the ratchet wheel.

2. In a hand brake mechanism having an element adapted to be rotated to effect application of the brake proper, the combination with a ratchet wheel rotatable in unison with said element, said ratchet wheel being provided with peripherally located teeth; of a pivoted release lever; a toothed dog cooperable with said teeth of the ratchet wheel, said dog being pivoted to said lever at a point intermediate the lever pivot and the ratchet wheel; and means for limiting the pivotal movement of the dog with respect to the lever when the dog is in operative engagement with the ratchet wheel.

3. In a hand brake mechanism having an element adapted to be rotated to effect application of the brake proper, the combination with a ratchet wheel rotatable in unison with said element, said ratchet wheel being provided with peripherally located teeth; of a pivoted release lever; a toothed dog cooperable with the tooth of said ratchet wheel, said dog being pivoted to said lever at a point intermediate the lever pivot and the ratchet wheel, the pivotal axis of said dog and lever being disposed to the inside of a line extending between the lever pivot and the point of contact between the dog and the ratchet wheel when the dog is in operative position; means limiting the pivotal movement of the dog with respect to the lever when the dog is in operative engagement with the ratchet wheel; and spring means cooperable with said dog and release lever to yieldingly hold the dog in engagement with the teeth of the ratchet wheel.

4. In a hand brake mechanism having an element adapted to be rotated to effect application of the brake proper, the combination with a ratchet wheel rotatable in unison with said element, said ratchet wheel being provided with peripherally located teeth, each having an undercut operative bearing face; of a pivoted release lever; a toothed dog cooperable with the teeth of said ratchet wheel, said dog being pivoted to said lever at a point intermediate the lever pivot and the ratchet wheel, the pivotal point of connection between the dog and lever being located inwardly toward the ratchet wheel of a line extending between the lever pivot and the point of contact of the dog with the ratchet wheel; means limiting the pivotal movement of the dog with respect to the lever when the dog is in operative engagement with the ratchet wheel; and spring means cooperable with the dog and lever, normally yieldingly holding the dog in operative relation with the ratchet wheel.

5. In a hand brake mechanism having an element adapted to be rotated to effect application of the brake proper, the combination with a ratchet wheel rotatable in unison with said element, said ratchet wheel having a series of ratchet teeth each provided with an undercut operative bearing face; of a pivoted release lever; a toothed dog cooperable with the teeth of said ratchet wheel, said dog being pivoted to said lever and oscillatable with respect thereto; and means limiting the pivotal movement of the dog with respect to the lever when the dog is in operative engagement with the ratchet wheel.

6. In a mechanism of the character described, the combination with a ratchet wheel having a series of ratchet teeth thereon, each tooth having an undercut operative bearing face; of a pivoted release lever; a toothed dog cooperable with and adapted to engage said bearing faces of the tooth of the ratchet wheel, said dog being pivoted to said lever at a point intermediate the lever point and the ratchet wheel, the pivotal connection between the dog and lever being located inwardly toward the ratchet wheel of a line connecting the lever pivot and the point of contact of the dog with a bearing face; spring means normally maintaining said dog in operative relation with the teeth of the ratchet wheel; and means limiting the pivotal movement of the dog with respect to the lever when the dog is in operative engagement with the ratchet wheel.

7. In a mechanism of the character described, the combination with a ratchet wheel provided with a series of ratchet teeth each having an undercut operative bearing face; of a release lever pivotally mounted about an axis parallel to the axis of rotation of the ratchet wheel; a dog cooperable with said ratchet tooth, said dog being pivoted intermediate its ends to said lever at a point on the latter intermediate the lever pivot and the operative end of the dog, said dog being provided with an extension having spaced shouldered portions thereon, engageable with the lever pivot to thereby limit the pivotal movement of the dog with respect to the lever; and spring means normally holding said dog yieldingly in engagement with the ratchet wheel.

In witness that I claim the foregoing I have hereunto subscribed my name this 25th day of August, 1921.

KEITH WILLIAMS.

Witnesses:
CARRIE GAILING,
UNA C. PERIN.